Aug. 28, 1956  J. F. GORDON  2,760,840
MAGNETIC INDICATOR-RECORDER SYSTEM
Filed June 7, 1951  3 Sheets-Sheet 1

JAMES F. GORDON
*INVENTOR.*

BY
*Killman and Kerst*
*Attorneys.*

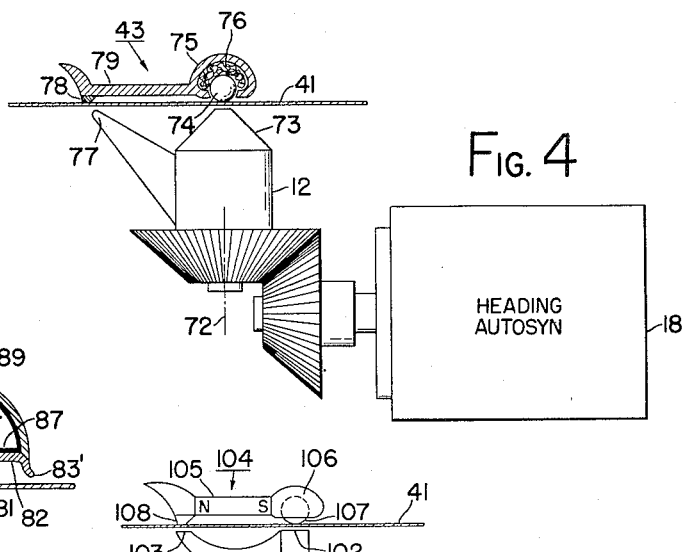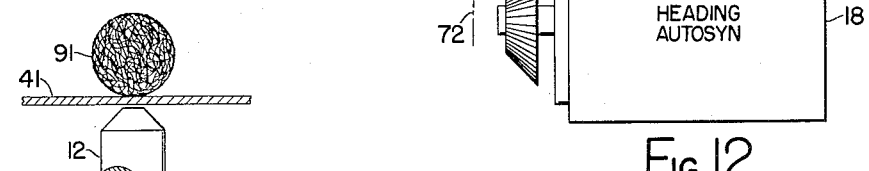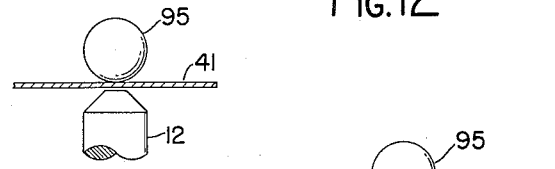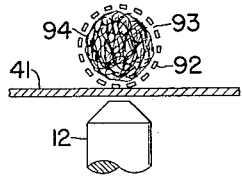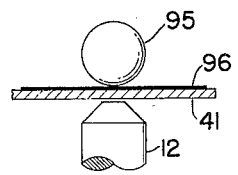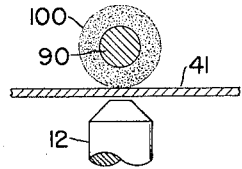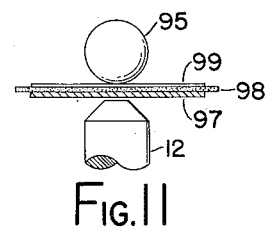

JAMES F. GORDON
*INVENTOR.*

United States Patent Office 2,760,840
Patented Aug. 28, 1956

2,760,840

MAGNETIC INDICATOR-RECORDER SYSTEM

James F. Gordon, Towson, Md., assignor to Bendix Aviation Corporation, Towson, Md., a corporation of Delaware Application June 7, 1951, Serial No. 230,370

18 Claims. (Cl. 346—8)

This invention relates to recorders and indicators in general and more particularly to systems for indicating and/or recording the position of a point on a two dimensional plot or map.

Prior art devices of this type have conventionally been provided with a stylus or pointer which is positioned on the plot by a controlled carriage which moves in response to the information to be displayed. As the carriage moves the stylus make a mark on the plot to record the track of its motion. These devices suffer from many inherent disadvantages including the obstruction to the viewing of the plot which the carriage presents and the difficulty with which the recording blanks may be inserted and removed from the recording position due to the interference of the carriage and stylus structure. In order to minimize the structure present above the chart it is customary to drive the carriage by means of a belt and pulley drive system which is susceptible to frequent misalignment as well as exposing a delicate mechanism in a position to be easily damaged.

It is an object of the present invention to provide a new and improved indicating or recording system which provides an indication or recording on a chart or the like without requiring any mechanical connections to the movable indicating or recording device.

Another object is to provide an indicating or recording system which is rugged, compact and is easy to use and does not have any exposed moving parts which are driven by a mechanical linkage.

A further object is to provide a plotting system in which the indicator comprises substantially only a rolling ball.

Another object is to provide, in an indicating and recording system, a rolling indicator-recorder which is positioned magnetically.

Another object is to provide a directional position indicator which is oriented magnetically for both position and direction.

Another object is to provide for a recorder an inked stylus which is magnetically positioned.

A further object is to provide a magnetic rolling member having a self-contained ink supply.

Another object is to provide a magnetic rolling printer which is supplied with ink from a magnetic satellite body.

A still further object is to provide in a magnetic rolling indicator system various means for recording the track of the indicator.

These and other objects of the invention may be accomplished, for example, by providing structure equivalent to that disclosed in the accompanying drawings.

The primary features of the invention in the preferred embodiment thereof comprise a plotting system in which a magnetic cone-shaped member is moved over the active plotting area in response to the positional information supplied to the orienting mechanism. The chart or plotting board is positioned to be coextensive with the plotting area. There is thus provided on the surface of the chart a localized magnetic anomaly at the position to be indicated. This anomaly may be a magnetic pole if the cone-shaped member is a magnet or it may be the region near a high permeability member if the cone is an unmagnetized magnetic material member. The magnetic cone moves on one side of the chart plane and a magnetic follower placed on the other side of the chart will move on the chart and accurately indicate the position of the apex of the cone provided that either the cone or the follower incorporates a magnet into the system to provide magnetic attraction therebetween. If a record of the track of the follower is desired suitable means are provided for making a legible mark as the follower moves.

In the drawings:

Fig. 4 is a plan view of the position and heading indicator magnet and follower;

Fig. 5 is an elevation partly in section of a modified ball printer and inker assembly;

Figs. 6, 7 and 8 are elevation views of modified forms of ball printers;

Fig. 9 is an elevation view of a ball indicator;

Figs. 10 and 11 are elevation views of a ball indicator-recorder; and

Fig. 12 is a plan view of a further modification.

Figure 1:
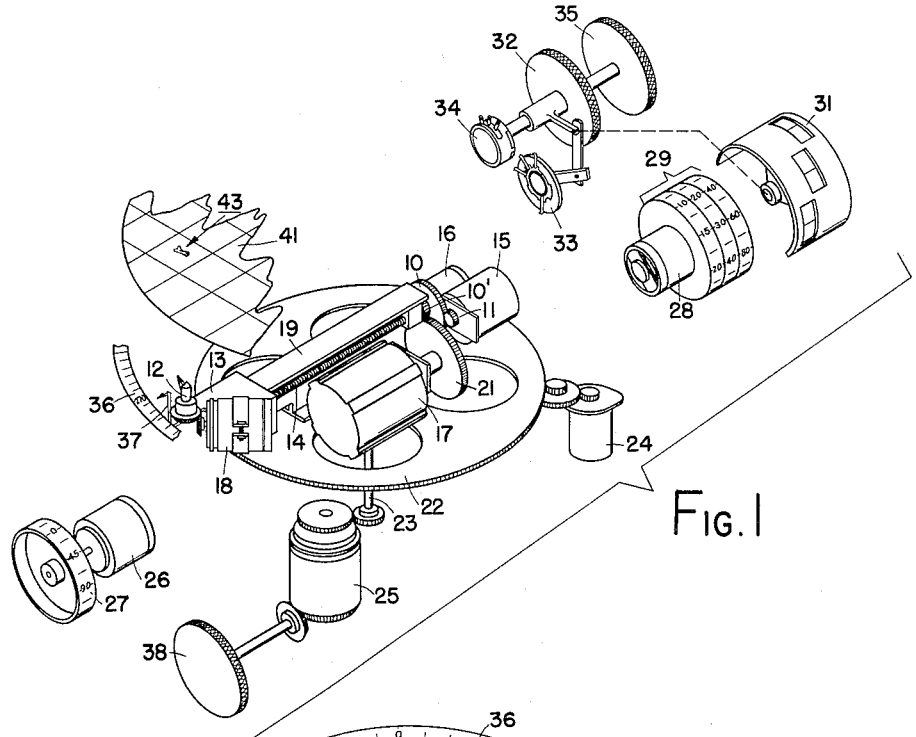
Fig. 1 is a perspective view, partially exploded, of the plotting system in a pictorial computer.

Referring now to Fig. 1, there is shown a pictorial computer which provides a plotting mechanism suitable for designating the distance and bearing of an aircraft from a given point and the heading of the aircraft. The plotting mechanism comprises a magnetic positioner 12, which will be more fully described hereinafter, mounted on a distance carriage 13 which is in threaded engagement with a distance carriage drive screw 14 and moves on a distance carriage track 19 in response to the rotation of screw 14. The carriage drive screw 14 is driven by a gear 10 which engages a gear 11 driven by a distance drive motor 15. Gear 10 drives gear 20, best seen in Fig. 3, to drive a distance self-synchronous generator 16 which may be of the type designated by the trade name Autosyn. Gear 10', which is one the same shaft as gear 10, drives gear 21 to drive a distance follow-up helical potentiometer 17. The motor 15 and the potentiometer 17 form part of a distance servo loop as will be described hereinafter. Mounted on the distance carriage 13 in geared relation with the position indicator magnet 12 is a heading repeater Autosyn 18. The entire assembly of the distance carriage 13 and the distance carriage track 19, the motor 15, Autosyns 16 and 18, and potentiometer 17 is mounted on a radial carriage 22. The carriage 22 is mounted for rotation about an axis 23 and is rotatably driven by means of suitable gearing by radial drive motor 24. Also geared to shaft 23 is a radial carriage Autosyn resolver 25. The motor 24 and the Autosyn 25 form parts of a radial drive servo loop as will be more fully explained hereinafter.

Associated with the equipment of Fig. 1 is a heading repeater Autosyn 26 having a heading indicator dial 27 attached thereto and a distance repeater Autosyn 28 having distance dials 29 attached thereto and a scale mask 31 associated therewith. The mask 31 is operated by a select distance dial 32 which also operates selector switch 33 which together with potentiometer 34, controlled by calibrate distance knob 35, acts in circuit with the potentiometer 17 to control the reference voltage in the distance servo as will be more fully explained with reference to Fig. 2.

A fixed peripheral scale 36, a fragmentary portion of which is shown, provides a bearing indicator scale upon which the bearing of an aircraft from the reference position is indicated by a pointer 37 which is fixed to the radial carriage 22. A radial calibrating knob 38 provides a manual adjustment of Autosyn 25 for calibration of the radial position of the carriage 22 and indicator 37.

A map 41 shown displaced above its normal position in the plane of scale 36 is provided which corresponds to the area of interest and has its center point representing the reference location coincident with the axis of shaft 23 about which the carriage 22 rotates. The map 41 is positioned with a suitable backing material, not shown, in a position such that the stylus 12 moves along the under face of the map and in closely spaced relation thereto. The map 41 is of non-magnetic material and a magnetically oriented rolling indicator 43 rolls on the upper surface of the map 41 in correspondence with the subtended position of the magnet 12.

Figure 2:
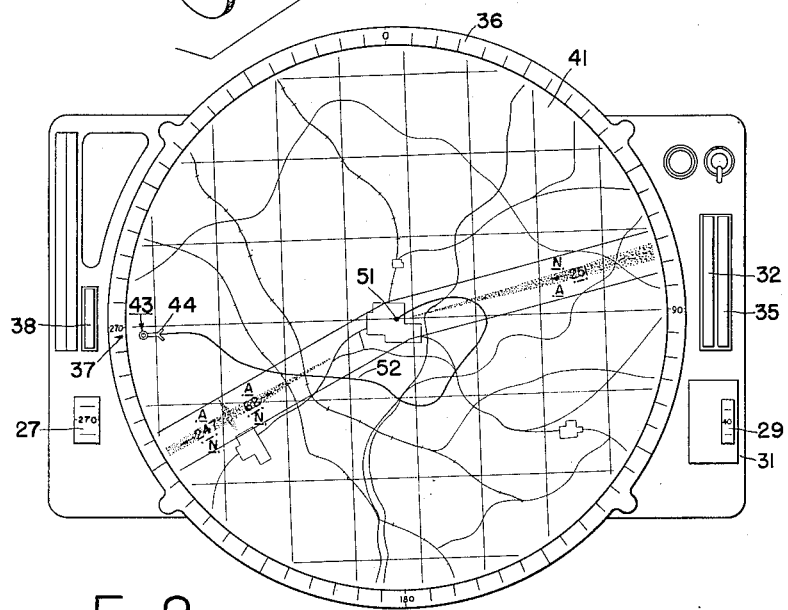
Fig. 2 is a plan view of a computer showing the plotting area.

Referring now to Fig. 2, there is shown a plan view of the indicator-computer as it would appear in an aircraft as it leaves an air field 51. Around the edges of the assembly are shown the heading indicator 27, the distance scale 29, made visible through one of the openings in mask 31, the distance selector and distance calibrate dials 32 and 35 and the radial calibration dial 38. The peripheral bearing scale 36 surrounds the map and is calibrated in degrees and the indication of the stylus 37 thereon is in the neighborhood of 270°. The map overlay 41 shows the airport 51 at the central reference position and features of the existing conditions of the terrain and radio and navigational signals and the like.

The position indicator generally designated 43 has a split tail assembly 44 which provides two sliding contact points on the map to provide vertical stability and which is oriented by a suitable means to be hereinafter described for indicating the heading of the aircraft. The path which the aircraft has flown from the time it left the airport, at 51, until its location as shown by the indicator 43, is shown by the record path 52.

Figure 3:
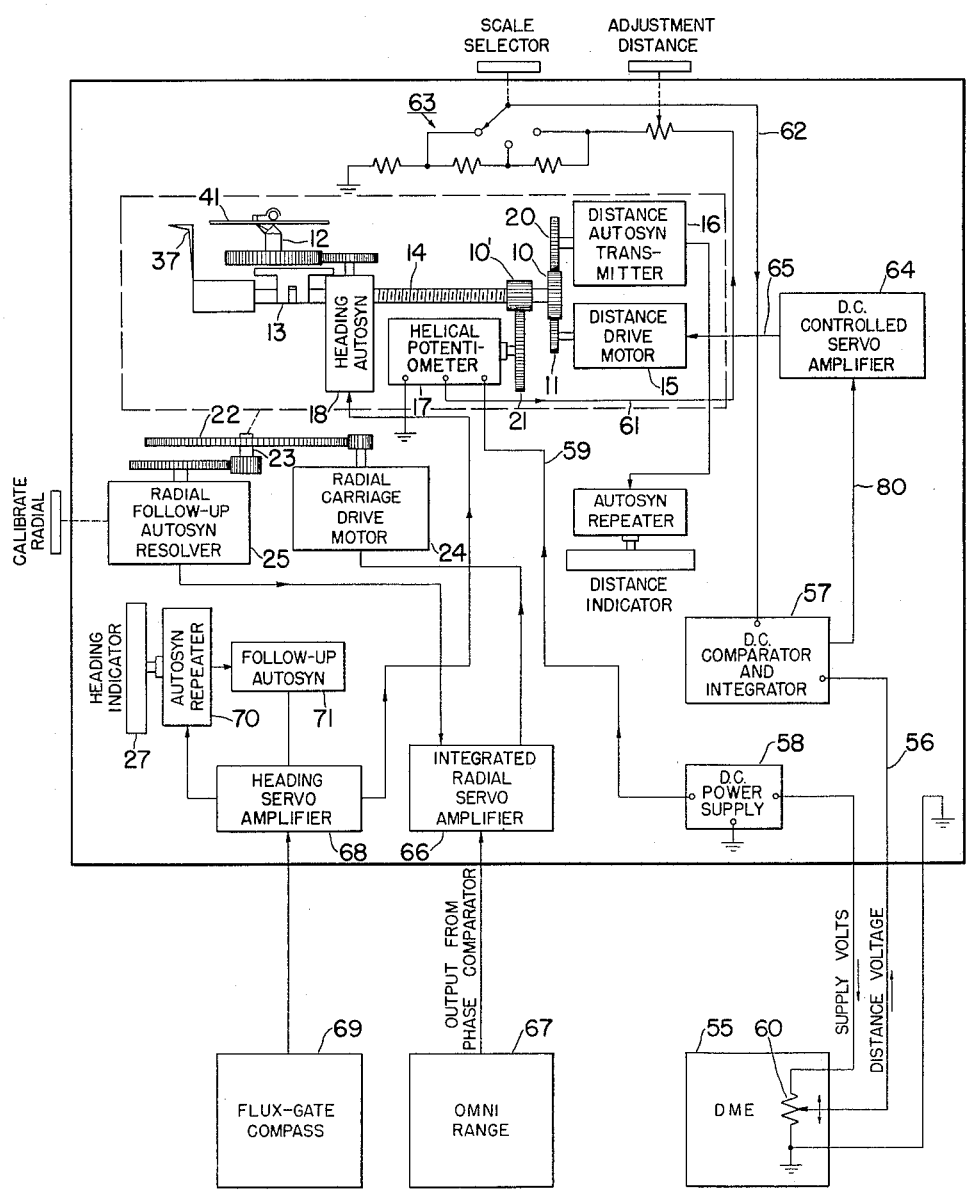
Fig. 3 is a block diagram of the computer.

Referring to Fig. 3 the control system for the plotting mechanism will be described. An elevational view of the position indicator magnet 12 and the drive mechanism therefor similar to that shown in Fig. 1 is shown. Included are the drive screw 14, drive motor 15, distance Autosyn 16, the carriage 13 and potentiometer 17 for distance control, and radial carriage 22, radial motor 24, and radial Autosyn 25 for radial position control.

The position of the carriage 13, along the distance screw 14 is controlled by a voltage derived from a distance measuring equipment (DME) 55 which may conveniently be of the transpondor type which provides a variable voltage source, indicated as potentiometer 60, directly proportional to the distance between the aircraft and the reference point. This voltage is supplied via lead 56 to a D. C. comparator 57, where it is compared with a voltage derived from the potentiometer 17 as follows. All positions of the carriage 13 have associated therewith a particular setting of the potentiometer 17 by virtue of the positive gear linkage between the driver gear 11 on the motor 15 and the follower gear 21 on potentiometer 17. A D. C. voltage from a power supply 58 provides an input to potentiometer 17 by way of lead 59. The voltage output of potentiometer 17 on lead 61 is proportional to the distance setting of the carriage 13. A predetermined portion of this voltage appears on lead 62 from the output of a scale selector distance-calibrating network generally designating 63. This voltage on lead 62 is also applied to the D. C. comparator 57 and the difference voltage existing between the voltages on leads 56 and 62 produces an output signal at path 80 which controls a servo amplifier 64 and provides an output signal at path 65. This signal is of such a character as to drive the distance motor 15 in the direction such that the voltage difference existing between leads 62 and 56 is reduced to substantially zero.

The radial carriage 22 is rotated to give bearing indication by means of the radial drive motor 24 which is energized by the servo amplifier 66 which is controlled from the output signals of an omni-range device 67 and the follow-up Autosyn 25.

The positions of the heading indication of indicator 12 and the dial 27 are controlled by the heading Autosyn 18 and Autosyn repeater 70, respectively, which are driven by servo amplifier 68. Amplifier 68 is under the control of heading information derived from a heading information device such, for example, as a flux-gate compass 69 and the follow-up signal from Autosyn 71 which is positioned by the repeater 70.

In operation, the system, so far described, provides information related to the range between the aircraft and a given point by means of distance measuring equipment 55 and this information is utilized to adjust the position of the carriage 13 on the distance screw 14 to provide the correct distance position of the magnet 12. The bearing of the aircraft, with respect to the reference point, is provided by the omni-range device 67 which controls the angular orientation of the carriage 22 to position the magnet 12 at the correct bearing position with respect to the center of rotation of the carriage. In this manner, it can be seen that the magnet 12 is positioned with respect to a map over-lay in accordance with the aircraft's actual position with respect to the ground area corresponding to the map. The heading of the aircraft is determined by a heading sensitive device 69 and the heading information controls the rotational position of magnet 12 about its own axis, thereby providing a heading indication as will be more fully explained hereinafter.

Referring now to Fig. 4, the details of the position and heading indicator magnet system will be described. The magnet 12 is pivoted about an axis 72 which corresponds on the carriage 13 to the position to be indicated. The magnet has a cone-shaped pole 73 and is located so that the tip of the cone is directly beneath the map over-lay 41. This arrangement provides a magnetic pole anomaly on the viewed surface of the map at a position corresponding to the location of the aircraft. For heading indications the magnet 12 is provided with an off-set arm 77, the tip of which is a magnetic pole and may be the pole opposite the pole at cone 73, if desired. The rotation of magnet 12 about axis 72 is controlled by the heading Autosyn 18 by means of suitable gearing.

The indicator 43 comprises a magnetic ball 74 which is free to roll on the viewed surface of the map 41. The ball 74 may be housed in a suitable housing 75 with an ink supply 76 therein, thus providing for inking the ball and printing a track of its path as it rolls to follow the motion of magnet 12. The inking of the ball 74 in this assembly is similar in operation to that employed in ball point pens which are well known. A tail portion 78 is provided which is magnetic and is secured in spaced relation to housing 76 by member 79.

In this manner it can be seen that the indicator 43 will follow the position of magnet 12 by means of the attraction between the magnet pole 73 and the magnetic ball 74. The ball will roll as it follows the position of the magnet 12 and will produce an inked line as it rolls. The heading of the aircraft will be represented by the relative position of arm 77 with respect to the axis 72 and the magnetic tail member 78 will follow the motion of the arm 77 to give a realistic heading indication for the aircraft.

Referring now to Fig. 5, there is shown a modified indicator assembly comprising the indicator-inker ball 81 mounted for rotation in a disk-like member 82 which is provided with a plurality of tips 83—83' which provide sliding support for the assembly as it rolls. The disk is provided with a hemispherical cover 88. The tips 83—83' are of such a length that they do not contact the map surface 41 unless the entire assembly tilts slightly, which it does when in motion. The motion of the ball 81 in the direction of the arrow 84 produces rotation of the magnet satellite ball 85 in the opposite direction due to the magnetic traction between balls 81 and 85.

For motion of the assembly in the direction of arrow 86, the position of the ball 85 will be as shown and the tip 83 will be in contact with the map 41 due to a slight tilt in the assembly in the direction of the arrow 84. In this manner the ball 81 will be inked by the ball 85 which rides in the ink reservoir 87 and the trailing tip 83' will not smear the mark which has just been made. For a change in direction of the motion of the assembly, the ball 85 will ride over the periphery of ball 81 to a new position corresponding to a leading position with respect to the new direction of motion. During this transition, the ball 85 continues to ink the ball 81 by rolling in the ink lining 89 of the hemispherical shell 88. The ink lining 89 may be any suitable paste ink or ink pad type.

Various novel recording devices are provided by this invention which comprise essentially only a magnetic rolling body which is adapted to deposit a quantity of marking material as the body rolls. In Fig. 6 is shown a ball 91 which is made of porous magnetic material or has the surface thereof suitably grooved or knurled such that the ball contains surface communicating chambers that may be impregnated with ink thereby providing a recording element for use with a magnetic indicator system.

In Fig. 7 a hollow magnetic ball 92 is provided with a series of holes 93 in the surface thereof. Inside the ball is a quantity of absorbent material 94 which may contain absorbed ink. In operation ink contained in material 94 will flow in small quantities from the holes 93 as the ball rolls.

The modification shown in Fig. 8 provides a magnetic core 90 surrounded by a shell 100 of porous metal or other material which may be impregnated with ink. The core 90 is attracted to the magnet 12 so that the assembly rolls to follow the motion thereof with the saturated surface of the coating 100 in rolling contact with the chart 41 to print a line thereon.

Fig. 9 shows an arrangement suitable for use as an indicator without any provision for inking the track of the indicator. The magnet 12 is positioned beneath the map 41 has has been described and a magnetic ball 95 of any suitable type is placed on the surface of the chart 41 opposite the position of the magnet 12. By allowing the ball 95 to freely roll in following the movement of magnet 12, the position of the magnet will be indicated by the position of the ball.

When a record of the track of the indicator is desired without using the inking or printing devices hereinbefore described other modifications may be employed. Fig. 10 shows an arrangement similar to Fig. 9 with provision for producing a record of the motion of the ball 95. Such a record is produced by inserting a piece of carbon paper 96 or like impression marking transfer material over the face of the chart 41 such that the pressure of the ball 95, as it rolls, will produce a mark on the paper 41 from the transfer of material from the carbon paper 96.

Fig. 11 is another system similar to Fig. 9 with a provision for recording the track of the ball 95 in which a dark supporting plate 97 is provided. This plate 97 has coated thereon a wax surface 98 and is covered by a sheet 99 of plastic material or the like. In this system, as the ball 95 rolls in following the magnet 12, the plastic sheet is depressed through the wax 98 and leaves a visible mark showing the dark surface of the plate 97 through the layer of wax where the ball has rolled. Indications with this type system can be eradicated by merely separating the sheet 99 from the plate 97 and its wax covering 98, and may be used repeatedly for successive records.

Fig. 12 is a view somewhat like Fig. 4 showing a modification of the present invention in which the magnet and permeable material structure have been interchanged. A high permeability magnet material yoke 101 is provided with two portions 102 and 103 in closely spaced relation to the under side of the map 41. The yoke 101 is positioned by the carriage 13 and rotated about the axis 72 by the Autosyn 18 in the same manner in which the motion of magnet 12, cone 73 and arm 77 were provided in Fig. 4. A follower generally designated 104 has a magnet 105 providing spaced poles N and S. Near one pole S is a housing 106 having a bearing in which a magnetic ball 107 is free to roll. Near the other pole N is a magnetic body 108 in contact with the map 41. The housing 106 and the body 108 are joined to respective ends of the magnet 105 and are magnetized by induction therefrom. In operation the assembly 104 and the yoke 101 are disposed adjacent the same points on map 41 on opposite sides thereof and the yoke 101 completes a magnetic path between the poles N and S. The assembly 104 thus follows the translational and rotational motion of the yoke 101 due to the magnetic attraction therebetween and indicates and records position and indicates heading.

Obviously many modifications are apparent in the light of the above teachings and are to be understood as being within the scope of the present invention. This invention includes, for example, magnetic positioning means for all manner of recording or indicating plots and charts, such as where the record chart is secured to a cylindrical drum or the like, and is not limited to flat charts, since the magnetic attraction of the rolling member can be made sufficiently strong to completely overcome any gravity effects.

What is claimed is:

1. A plotting device of the type having provision for indicating values of a function on a display chart comprising, a magnet translatable behind the viewed surface of said chart, said magnet providing a localized pole on said viewed surface of said chart corresponding to the position of said magnet, means for translating said magnet in plotting relation to said chart in accordance with the chart values of said function, and an indicator positioned on said viewing surface at said pole and free to move to follow the motion of said magnet and pole, said chart constituting the sole support of said indicator, said indicator comprising a magnetic sphere, rollable on said viewing surface.

2. In a heading and position indicator of the type having provision for indicating the position and heading of a vehicle on a map of the area under consideration, magnetic means movable behind the viewed surface of said map, said means extending close to said map at a pair of spaced points so as to provide a pair of localized regions on said viewed surface joined by a path of relatively low magnetic reluctance and constant length, means for translating said magnetic means in indicator relation to said map such that one of said regions is oriented on said map in accordance with the map location corresponding to said position to be indicated, means for rotating the other region of said pair with respect to said one region, means for controlling the rotation of said other region in accordance with the heading to be indicated such that the map-surface line joining said pair of regions bears predetermined relation to said heading, and a directional indicator positioned on said viewed surface at said one region with the directional indication thereof in said predetermined relation with said map-surface line, said map constituting the sole support of said indicator, said indicator comprising spaced magnetic means movable to follow the motion of respective ones of said regions, and at least one of said magnetic means of each pair of said movable magnetic means and said spaced magnetic means including a source of magnetizing force.

3. In a heading and position indicator of the type having provision for indicating the position and heading of a vehicle on a map of the area under consideration, magnetic means translatable behind the viewed surface of said map, said means providing a pair of localized poles on said viewed surface, means for translating said magnetic means in indicator relation to said map such that one of said poles is oriented on said map in accordance with the map location corresponding to said position to be indicated, means for rotating the other pole of said pair with respect to said one pole, means for controlling the rotation of said other pole in accordance with the heading to be indicated such that the map-surface line joining said pair of poles bears predetermined relation to said heading, and a directional indicator positioned on said viewed surface at said one pole with the directional indication thereof in said predetermined relation with said map-surface line, said map constituting the sole support of said indicator, said indicator comprising, a magnetic sphere, a non-magnetic bearing housing for said sphere in which said sphere is free to roll on said map and thereby move in said housing in any direction on said map, and a second magnetic body joined in spaced relation to said housing.

4. In a chart recording system of the type having a magnet translatable in accordance with the record to be made, the movement being over the surface of the recording chart reverse to the surface thereof upon which the record is to be made, recording means comprising a magnetic rolling body supported solely by said chart on the recording surface thereof and means for recording on said recording surface the track of said rolling body as it rolls thereon.

5. A plotting device of the type having provision for indicating and recording values of a function on a display chart comprising, a magnetic means extending close to said chart at one point so as to be translatable behind the viewed surface of said chart, said means provide a path of relatively low magnetic reluctance passing through a localized region on said viewed surface of said chart corresponding to the position of said point, means for translating said magnetic means in plotting relation to said chart in accordance with the chart values of said function, and a recording indicator positioned on said viewing surface at said region and free to move to follow the motion of said region, said chart constituting the sole support of said recording indicator, said recording indicator comprising magnetic means including a rolling body, at least one of said magnetic means including a source of magnetizing force, and means for recording on said chart the track of said body as it rolls thereon.

6. In a heading and position device of the type having provision for indicating and recording the position and heading of a vehicle on a map of the area under consideration, magnetic means movable behind the viewed surface of said map, said means extending close to said map at a pair of spaced points so as to provide a pair of localized regions on said viewed surface joined by a path of relatively low magnetic reluctance, means for translating said magnetic means in indicator relation to said map such that one of said regions is oriented on said map in accordance with the map location corresponding to said position to be indicated, means for rotating the other region of said pair about the axis normal to said map at said one region, means for controlling the rotation of said other region in accordance with the heading to be indicated such that the map-surface line joining said pair of regions bears predetermined relation to said heading, a directional recording indicator positioned on said viewed surface at said one region and supported solely by said map, with the directional indication thereof in said predetermined relation with said map-surface line, said recording indicator comprising magnetic means including a magnetic rolling body at said one region and a spaced magnetic body at said other region movable to follow the motion of respective ones of said regions, at least one of said magnetic means at each said region including a source of magnetizing force, and means for recording on said map the track of said rolling body as it rolls thereon.

7. Inked magnetic recording means adapted to be positioned on a chart by a subtended magnet comprising, a housing, a bearing for rollably mounting a ball in a wall of said housing, a magnetic ball mounted in said bearing, said housing including a reservoir for inking said ball as it rolls, and supporting members extending from said housing by an amount less than the maximum extension of said ball therefrom and arranged around said ball to form supporting contacts on said chart in addition to the ball contact as said ball rolls.

8. Inked magnetic recording means adapted to be positioned on a chart by a subtended magnet comprising, a housing, a bearing for rollably mounting a ball in a wall of said housing, a first magnetic ball mounted in said bearing, and a second magnetic ball within said housing and in rolling contact with said first ball when said first ball rolls to follow the motion of said magnet, said housing including an ink reservoir in which said second but not said first ball rolls.

9. Inked magnetic recording means adapted to be positioned on a chart by a subtended magnet comprising, a housing, a bearing for rollably mounting a ball in a wall of said housing, a first magnetic ball mounted in said bearing, a second magnetic ball within said housing and in rolling contact with said first ball when said first ball rolls to follow the motion of said magnet, said housing including an ink reservoir in which said second but not said first ball rolls, and supporting members extending from said housing by an amount less than the maximum extension of said first ball therefrom and arranged around said ball to form supporting contacts on said chart in addition to the contact on said chart of said first ball as it rolls.

10. Inked magnetic recording means adapted to be positioned on a chart by a subtended magnet comprising, a magnetic ball, a bearing housing for said ball in which said ball is free to rotate, said ball extending from said housing and said housing having a reservoir for inking said ball as it rolls therein, a magnetic body joined in spaced relation to said housing, and means giving said recording means vertical stability as said ball rolls and said body moves on the recording surface of said chart.

11. A self-inking ball for a magnetic recorder comprising, a porous magnetic ball, said ball having ink impregnable porous spaces therein and said spaces being in substantially uniform liquid communicating relation with the surface of said ball.

12. A self-inking ball for a magnetic recorder comprising, a magnetic spherical shell having a plurality of substantially uniform liquid communicating openings therein and a quantity of ink absorbent material within said shell.

13. A self-inking ball for a magnetic recorder comprising, a magnetic body, and a porous shell covering said ball which is ink impregnable.

14. Magnetic indicator means adapted to be positioned on a chart by a subtended magnet comprising, a magnetic ball, a bearing housing for said ball in which said ball is free to rotate, said ball extending from said housing, a magnetic body joined in spaced relation to said housing, and means for supporting said indicator means with vertical stability by bearing on said chart as said ball rolls and said body moves on the surface of said chart.

15. An indicator for traversing the surface of a chart under the influence of magnetic attraction between said indicator and magnet means on the opposite side of said chart comprising, an indicator body, spaced members for supporting said body on said chart by contact therewith, said members constituting the sole supporting means for said body, and high permeability material means associated with at least one of said members adjacent the point of contact thereof with said chart.

16. An indicator for traversing the surface of a chart under the influence of magnetic attraction between said indicator and magnetic means on the opposite side of said chart comprising, an indicator body, spaced members for supporting said body on said chart by contact therewith, said members constituting the sole supporting means for said body, and magnet means associated with at least one of said members adjacent the point of contact thereof with said chart.

17. Magnetic indicator means adapted to be positioned on a chart opposite a subtended high permeability body comprising, an indicator body, spaced members for supporting said body on said chart by contact therewith, said members constituting the sole supporting means for said body, and magnet means having at least two magnetic poles, said poles being individually associated with individual ones of said members adjacent the point of contact thereof with said chart.

18. A recording indicator for a magnetic recorder comprising, a magnetic rolling body supportable by bearing upon the record surface of said recorder, and means providing a transferable marking coating upon the surface of said rolling body, said indicator being so formed as to support itself stably in a marking attitude upon the record surface of said recorder and to continue said self-support while being drawn across said surface by the action of magnetic force applied from the opposite side of said surface.

References Cited in the file of this patent

UNITED STATES PATENTS

| | | |
|---|---|---|
| 2,058,306 | Fowler | Oct. 20, 1936 |
| 2,202,634 | Mack | May 28, 1940 |
| 2,417,339 | Woolley | Mar. 11, 1947 |
| 2,449,283 | Dike et al. | Sept. 14, 1948 |
| 2,500,907 | Stead | Mar. 14, 1950 |
| 2,534,820 | Hurvitz | Dec. 19, 1950 |
| 2,561,345 | Deloraine | July 24, 1951 |
| 2,582,043 | Krakulec | Jan. 8, 1952 |
| 2,606,530 | Bodnar | Aug. 12, 1952 |

FOREIGN PATENTS

| | | |
|---|---|---|
| 894,857 | France | Mar. 20, 1944 |